US007360695B2

(12) United States Patent
Ponert et al.

(10) Patent No.: US 7,360,695 B2
(45) Date of Patent: Apr. 22, 2008

(54) ACCESS CONTROL APPARATUS

(75) Inventors: Gregor Ponert, Salzburg (AT); Kurt Wallerstorfer, Irrsdorf (AT)

(73) Assignee: Skidata AG, Gartenau (AT)

( * ) Notice: Subject to any disclaimer, the term of this patent is extended or adjusted under 35 U.S.C. 154(b) by 228 days.

(21) Appl. No.: 11/084,681

(22) Filed: Mar. 18, 2005

(65) Prior Publication Data

US 2007/0001002 A1 Jan. 4, 2007

(30) Foreign Application Priority Data

Mar. 19, 2004 (DE) ..................... 10 2004 013 965

(51) Int. Cl.
*G06K 5/00* (2006.01)

(52) U.S. Cl. ...................................... 235/382; 235/384

(58) Field of Classification Search ................ 235/382, 235/384, 381, 375, 492; 340/10.1, 572.1, 340/572.9

See application file for complete search history.

(56) References Cited

U.S. PATENT DOCUMENTS

| | | | |
|---|---|---|---|
| 5,333,410 A * | 8/1994 | Tetherton | 49/35 |
| 5,414,249 A * | 5/1995 | Matsumoto | 235/384 |
| 6,012,252 A | 1/2000 | Kocznar et al. | |
| 6,044,586 A | 4/2000 | Wotke | |
| 6,170,194 B1 | 1/2001 | Kocznar et al. | |
| 6,310,581 B1 * | 10/2001 | Stockhammer | 343/718 |
| 6,450,404 B1 * | 9/2002 | Imazuka | 235/381 |
| 6,617,960 B1 | 9/2003 | Fischer et al. | |
| 6,744,369 B2 * | 6/2004 | Sata | 340/573.1 |
| 6,874,685 B1 * | 4/2005 | Moreau et al. | 235/384 |
| 7,061,383 B2 * | 6/2006 | Davis et al. | 340/573.1 |

FOREIGN PATENT DOCUMENTS

| | | |
|---|---|---|
| AT | 006 665 U1 | 1/2004 |
| EP | 0 961 005 B1 | 1/1999 |
| WO | WO 97/18379 A1 | 5/1997 |

* cited by examiner

*Primary Examiner*—Ahshik Kim
(74) *Attorney, Agent, or Firm*—Flynn, Thiel, Boutell & Tanis, P.C.

(57) ABSTRACT

An access control apparatus has a blocking element (1) which is moved by a motor (2) or similar actuator controlled via a control means. Provided are a first access authorization reader (12, 14), a second access authorization reader (13, 15) after the first access authorization reader (12, 14) in the area of the blocking element (1) as well as a people sensor (16) before the blocking element (1). The motor (2) can be driven by the first access authorization reader (12, 14) in the normal case, that is, upon valid reading of access authorization by the first access authorization reader (12, 14), by the second access authorization reader (13, 15) upon detection of a person and invalid reading of access authorization by the first access authorization reader (12, 14), and by the first access authorization reader again upon valid reading of access authorization of the detected person by the second access authorization reader (13, 15).

34 Claims, 1 Drawing Sheet

ACCESS CONTROL APPARATUS

FIELD OF THE INVENTION

This invention relates to an access control apparatus having a blocking element moved by an actuator controlled via a control means.

Such an access control apparatus is known from AT-U-6665. As a blocking element it uses a rotating arm assembly with a rotation axis inclined to the horizontal and two blocking arms enclosing an angle of about 120° or 240°, as known from EP-A 961005.

DESCRIPTION OF THE RELATED ART

The blocking arm releases the entrance in its basic position. However, if a person is detected without a valid reading of his access authorization being effected, the blocking arm is rotated into the entrance to block it.

To permit the blocking arm to be swiveled out of its basic or "open gate" position into the blocking position before a detected person without a valid reading of access authorization reaches the turnstile, the access authorization reader and the people sensor must be disposed at an appropriately great distance in front of the turnstile. Thus, a person who has passed the access authorization reader without access authorization can stand in front of the blocking arm then blocking the entrance and wait until the entrance is released by a following further person with valid access authorization. Since the release signal triggered by the further person has been used for opening the barrier for the person without access authorization, the entrance is blocked for the further person with valid access authorization. This problem is intensified by the fact that it does not occur only with persons without access authorization, but rather frequently because valid access authorization cannot be read, for example since a non-contact-type RFID transponder to be read is electromagnetically screened e.g. by some object in the person's pocket.

U.S. Pat. No. 6,617,960 B1 discloses an access control apparatus for two entrance lanes with a control device in the middle having on each side a rotating arm assembly with two blocking arms offset by 180°, and two non-contact-type access authorization readers on the outer sides.

BRIEF SUMMARY OF THE INVENTION

The problem of the invention is to provide an access control apparatus of the type stated in the preamble of claim 1 which ensures that persons with a valid reading of access authorization can pass the barrier but not persons with an invalid reading.

The first access authorization reader is followed in the direction of passage by a second access authorization reader. The second access authorization reader is preferably located in an area of the blocking element where valid access authorization of a person standing in front of the blocking element who has already passed the people sensor can be read by the second access authorization reader.

The control of the actuator moving the blocking element is designed e.g. so that in the normal case, i.e. upon valid reading of access authorization by the first access authorization reader, the first access authorization reader drives the actuator so as to release the entrance ("open gate" operation).

However, if in "open gate" operation a person is detected by the people sensor without valid access authorization being read by the first access authorization reader, the entrance is blocked by the blocking element and at the same time the actuator driven not by the first access authorization reader but by the second access authorization reader provided in the area of the blocking element.

If a valid reading of access authorization is then effected by the second access authorization reader, the entrance is released by the blocking element and the actuator driven not by the second access authorization reader but by the first access authorization reader again.

If no valid access authorization is read by the second access authorization reader either, the entrance remains blocked for the detected person without a valid reading by the first and second access authorization readers. He can thus only leave the entrance in the opposite direction or can move away with the help of the control staff, e.g. through manual release by the control staff.

The actuator is preferably a motor, in particular an electromotor. However, it can e.g. also be formed by an electromagnet, a piston/cylinder unit operable by a pressurizing medium, e.g. compressed air, or the like.

The inventive access control apparatus can be formed as a rotating barrier, for example with a rotating arm assembly as a blocking element. The rotating arm assembly preferably has only one or two blocking arms. The blocking element can have a rotation axis inclined to the horizontal for example by about 35° with a single blocking arm or with two blocking arms enclosing an angle of about 120° or 240°, as known from WO 97/18379 or from EP-A-961005, or a vertical rotation axis with one or two blocking arms according to WO 97/18379.

The release and blocking of the entrance is to be understood according to the invention not only mechanically but as a logical process. Thus, the blocking element can e.g. also be formed by an optical and/or acoustic signal generator, for example a green light for release and a red light indicating blocking.

An invalid reading of access authorization refers not only to the case in which the controlled person has no access authorization, but also to the case in which valid access authorization is present but not detected by the access authorization reader.

The two access authorization readers are preferably formed by non-contact-type readers, in particular for reading RFID transponders with access authorization stored thereon. The access authorization can also be a reference code for access authorization stored in a database and retrievable by the control apparatus. To detect the total width of the entrance lane, the first and/or second access authorization readers can each have an antenna on both sides of the entrance lane.

In the area of the blocking element an access authorization reader can additionally be provided to permit a blocked entrance to be opened e.g. with a magnetic, bar-code or similar ticket which is inserted into the access authorization reader.

While in some applications, for example a ski lift, the access control apparatus must generally only be passable in one direction, access control apparatuses to a delimited area are frequently designed to be passable in both directions. In the latter case, on each side of the second access authorization reader there is preferably a first access authorization reader, i.e. a reader that detects the person to be controlled in one or the other direction of passage before he reaches the second access authorization reader in the area of the blocking element.

The people sensor can be formed for example as an optoelectronic sensor. Preferably at least two people sensors are provided before the blocking element. This firstly prevents the danger of a faulty signal, for example due to objects such as ski poles, and secondly prevents two persons nestled against each other from passing the access control apparatus with only one access authorization.

Further, a people sensor is preferably provided after the blocking element. This people sensor is used for example to detect a person who cannot move on because of a jam following the access control apparatus. The blocking element can then be held in the blocking position until the people sensor after the blocking element no longer detects a person lingering longer than a certain time period.

A further people sensor can be provided in the area of the blocking element. If a rotating arm assembly is used as a blocking element, said people sensor can detect a person in the blocking plane of the blocking arm and optionally also trigger a rotation (pushing) of the person through the rotating arm.

The one or the at least two people sensors before the blocking element, the people sensor in the area of the blocking element and the people sensor after the blocking element can have different scanning characteristics and/or enclose a different scan angle with the direction of passage. That is, they can have a narrow or broad scan cone. For example, the people sensor before the blocking element can have a narrow scan cone to obtain as long a passage time as possible of the detected person up to the blocking element.

The motor can be activated to drive the blocking element in both directions of rotation. This can e.g. prevent a person who is detected by the people sensor after the blocking element because he is lingering there from being hit from behind by the blocking element. It can also allow for passing the access control apparatus in both directions, the blocking arm being moved contrary to the direction of passage in the preferred direction of rotation.

The actuator can be driven such that the blocking element is normally located in the release position moved out of the entrance lane, i.e. has released the entrance, before access authorization is read by the first access authorization reader ("open gate" position).

When the entrance is released in the normal position, however, there is the danger of the persons to be controlled being encouraged to pass the access control apparatus at high speed, for example of a skier moving into the access control apparatus at high speed at a ski lift.

If no valid access authorization is read by the first access authorization reader and thus entrance suddenly blocked by the blocking element, the skier can hit the blocking element at high speed and thereby be injured.

To reduce the consequences of such a collision, the blocking element, e.g. the blocking arm of a rotating arm assembly, can be provided with padding and/or be designed to be resilient, e.g. made of rubber-elastic material.

However, an optical or acoustic signal generator can also be provided to indicate a blocking and optionally the release of the entrance.

An optical display can also be realized by the blocking element, e.g. the blocking arm of a rotating arm assembly, releasing the entrance in the release position but being moved more or less far into the entrance lane. This also creates a psychological barrier against moving into the access control apparatus fast, i.e. warns that the blocking arm can be swung completely into the entrance lane and thus block it. To indicate with a blocking arm swiveled slightly into the entrance lane in the release position that the first access authorization reader has read valid access authorization, the blocking arm can be moved completely out of the entrance lane when a valid reading of access authorization has been carried out by the first access authorization reader.

To prevent a person from being encouraged by the release position of the blocking element before passing the first access authorization reader to move through the access control apparatus at high speed, the actuator can also from the start be controlled differently, namely for singling operation such that the blocking element blocks the entrance before valid reading of access authorization by the first access authorization reader, that is, in the normal position, and releases it only after valid reading by the first access authorization reader. A person moving toward the access control apparatus at high speed thus sees the entrance blocked by the blocking element and will reduce his speed accordingly. To avoid coming in contact with the blocking element, however, the blocking element is in this case moved out of the entrance after valid reading by the first access authorization reader before the person reaches the blocking element.

Further, it is possible to control the motor alternatively between "open gate" operation and singling operation in which the entrance is blocked in the normal position, i.e. between operation in which the blocking element releases the entrance before reading of access authorization by the first access authorization reader and blocks the entrance only after invalid reading by the first access authorization reader and detection of a person by the people sensor, and operation in which the blocking element blocks the entrance before valid reading of access authorization by the first access authorization reader and releases it only after valid reading by the first access authorization reader. For example, at a ski lift singling operation can be performed in the first operating hours of the day and then "open gate" operation for the rest of the day.

It is also possible to switch back and forth between the two operating modes automatically. It is thus conceivable to use "open gate" operation as long as a regular flow of people is present, since in this case it is not possible for skiers to move in fast. When the line of people comes to an end, however, one can switch to blocking operation with a time delay. The bar blocks the entrance. This is the case until further persons start passing through normally again. This combines the two advantages of open gate (no hindrance) and protection from fast entry (danger of accidents).

The blocking element preferably used is a rotating arm assembly with a single blocking arm. In the release position, i.e. in its downwardly rotated position, this one blocking arm can extend obliquely downward away from the entrance, for example at an angle of 10° or more from the perpendicular. Thus, in the release position of the rotating arm assembly the room on the entrance lane increases from the rotation axis thereof downward, thereby obtaining particularly convenient passage.

If a people sensor is provided which detects a person in the blocking plane, i.e. in the vertical plane in which the one blocking arm is located in the upwardly rotated blocking position extending across the entrance, the blocking arm can be rotated, upon detection of a person by said sensor, out of the release position into a waiting position, i.e. somewhat toward the blocking position but without blocking the entrance.

When the access control apparatus is set to singling operation, the blocking arm can then be rotated further out of the waiting position into the blocking position, thereby permitting the person in question to be lightly pushed by the blocking arm when his passing speed is too slow.

In "open gate" operation the blocking arm can be rotated back out of the waiting position into the release position after valid reading of access authorization by the first access authorization reader, in order to indicate the release to the controlled person.

On the other hand, upon an invalid reading the blocking arm can be rotated into the blocking position out of the waiting position faster than if it is necessary to rotate into the blocking position from the release position.

To prevent the blocking element from being held forcibly in the release position e.g. with ski poles despite an invalid reading in "open gate" operation, an alarm device can be provided which is actuated in case of such forcible blockage of the blocking element.

BRIEF DESCRIPTION OF THE DRAWINGS

Hereinafter the inventive access control apparatus will be explained in more detail by way of example with reference to the schematic drawings, in which.

Figure 1:
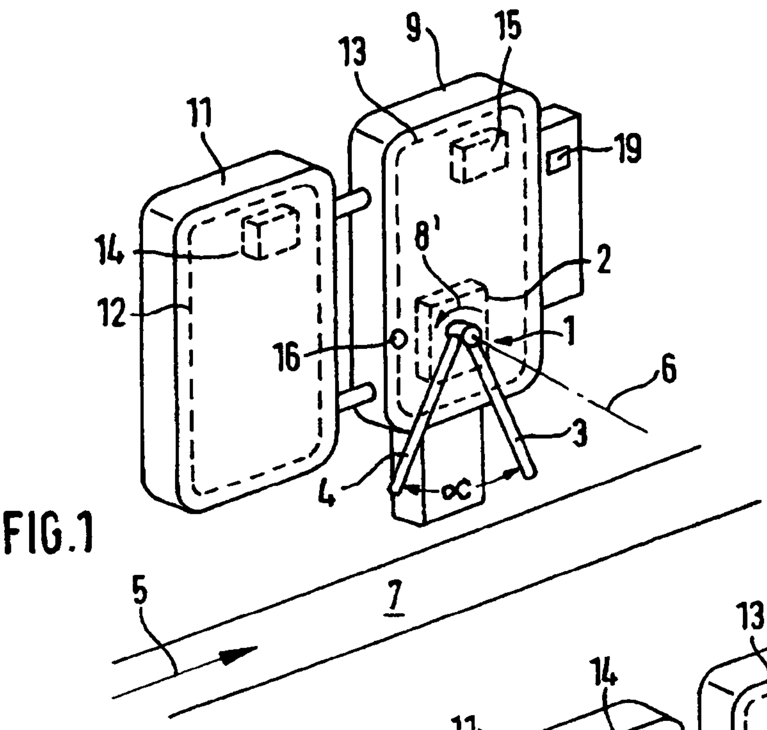
FIGS. 1 and 2 show perspective views of an access control apparatus in the release position and blocking position, respectively.

According to FIG. 1, the access control apparatus has a blocking element 1 formed as a rotating arm assembly which is driven by an actuator in the form of a motor 2 shown by dashed lines. The blocking element 1 is provided with two blocking arms 3, 4 for blocking the entrance 7 which is passed in the direction of the arrow 5.

DETAILED DESCRIPTION

The blocking element 1 is rotatable around an axis 6 inclined to the horizontal at an angle of about 35°. The angle which the blocking arms 3, 4 enclose with the rotation axis 6 is about 45° in each case. The angle $\alpha$ which the two blocking arms 3, 4 enclose with each other is about 120°.

Figure 2:
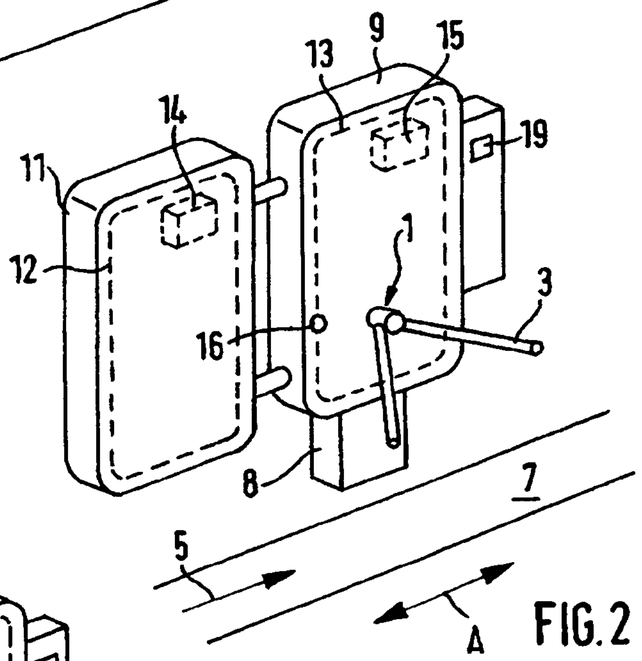

While in the release position shown in FIG. 1 both blocking arms 3, 4 are swiveled downward approximately vertically so that the entrance 7 is released, rotation of the blocking element 1 according to the arrow 8' swivels the blocking arm 3 into the horizontal blocking position, thereby blocking the entrance 7 as shown in FIG. 2.

The access control apparatus has a stand 8 which carries a housing 9. The housing 9 contains the motor 2; it also receives the components necessary for operating the rotating element 1 and the motor 2, such as the bearing and drive gear of the rotating element 1 and the electronics for controlling the motor 2.

The housing 9 has fastened thereto a further housing 11 which is disposed before the housing 9 in the direction of passage 5. The housing 11 and the housing 9 each contain an RFID reading module 14, 15 shown by dashed lines, with antenna 12, 13. Instead of being connected to two separate reading devices, the two antennae 12 and 13 can also be connected to a single reading module which is switchable between reception with the antenna 12 and reception with the antenna 13. What is decisive is thus that two antennae 12 and 13 are disposed one behind the other in the direction of passage 5.

Reading modules 14 and 15 with the antennae 12, 13 permit contactless reading of access authorization which is stored in a transponder as a data carrier which the access authorized person is carrying.

Further, an optoelectronic people sensor 16 is disposed between the first antenna 12 and the second antenna 13 e.g. in the housing 9.

When access authorization is read from the data carrier by the first access authorization reader 14, the entrance 7 is released as shown in FIG. 1. To provide sufficient time for reading the data carrier before the person passing into the entrance 7 reaches the blocking element 1, the antenna 12 of the first access authorization reader 14 is mounted at a distance A of for example 20 to 60 cm before the blocking element 1.

When the first access authorization reader 14 reads valid access authorization, the blocking element 1 remains in the release position shown in FIG. 1. However, when a person passes the first access authorization reader 14 and the people sensor 16 without a valid reading of access authorization, the blocking element 1 is swiveled into the blocking position shown in FIG. 2.

The person who has passed the antenna 12 of the first access authorization reader 14 without a valid reading and the people sensor 16 thus stands in front of the blocking arm 3 rotated into the blocking position according to FIG. 2. He can wait there until the entrance 7 is released by a second following person with valid access authorization.

To prevent this, the first access authorization reader 14 with the antenna 12 is switched off according to the invention upon an invalid reading of access authorization with the antenna 12 of the first access authorization reader 14 and detection of a person by the people sensor 16, and the second access authorization reader 15 with the antenna 13 is switched on and thus the motor 2 previously driven by the first access authorization reader 14 is now driven by the second access authorization reader 15. An access authorization of a person who follows the person standing in front of the closed blocking arm 3 is thus no longer detected by the first access authorization reader 14 with the antenna 12.

Instead, the access authorization of the person standing in front of the closed blocking arm 3 is checked again by the second access authorization reader 15 with the antenna 13. If valid access authorization is read by the second access authorization reader 15 in the new check, the second access authorization reader is switched off and the first access authorization reader 14 switched on again to drive the motor 2.

Further, an access authorization reader 19 for reading insertable, e.g. contact-type, data carriers is provided on the housing 9 in the range of the blocking element 1. Thus, the rotating barrier can also be opened by persons who only have such insertable data carriers with access authorization.

Figure 3:
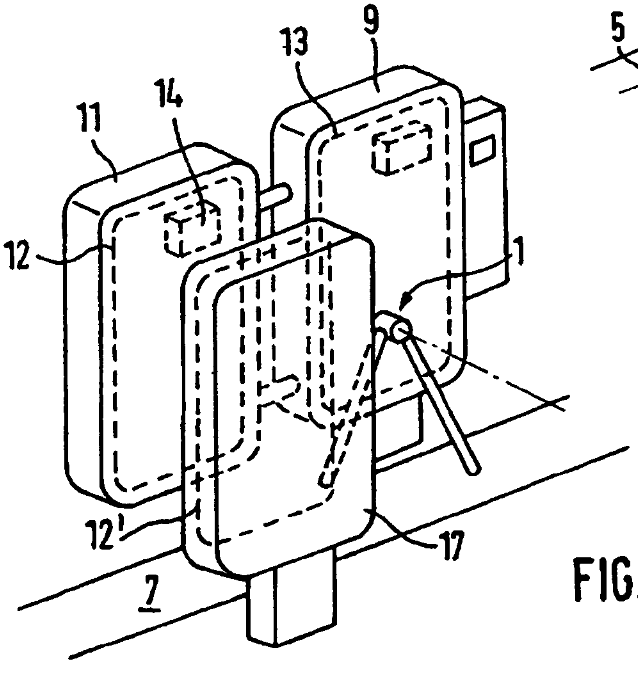
FIG. 3 shows another embodiment with two antennae on the first access authorization reader.

To detect the total width of the entrance lane 7 with the first access authorization reader 14, a further housing 17 with an antenna 12' shown by dashed lines is provided on the opposite side of the entrance lane according to FIG. 3, said antenna being connected to the first access authorization reader 14.

The invention claimed is:

1. An access control apparatus having a blocking element for movement by an actuator controlled via a control means, at least one people sensor, a first access authorization reader disposed before said blocking element and a second access authorization reader disposed in the area of said blocking element, whereby, through control of said actuator, said blocking element releases an entrance upon valid reading of access authorization by said first access authorization reader, while blocking said entrance upon detection of a person by said people sensor before valid reading of access authorization by said first access authorization reader, wherein when said blocking element blocks said entrance, said entrance remains blocked until valid reading of access authorization by said second access authorization reader.

2. An access control apparatus according to claim 1, wherein said first access authorization reader and said second access authorization reader comprise non-contact-type readers.

3. An access control apparatus according to claim 2, wherein at least one of said non-contact-type first and second access authorization readers includes an antenna on each side of an entrance lane of said entrance.

4. An access control apparatus according to claim 2, wherein a third access authorization reader for receiving a ticket with access authorization is provided in the area of said blocking element.

5. An access control apparatus according to claim 1, wherein said entrance is formed to be passable in both directions, and a first access authorization sensor is disposed before a second access authorization sensor on the side of the entrance opposite from the first access authorization reader.

6. An access control apparatus according to claim 1, wherein said actuator is driven such that said blocking element blocks said entrance before valid reading of access authorization by said first access authorization reader and releases said blocking element only after valid reading by said first access authorization reader.

7. An access control apparatus according to claim 6, wherein said blocking element releases said entrance before the detected person reaches said entrance after valid reading by said first access authorization reader.

8. An access control apparatus according to claim 7, wherein upon release of said entrance said blocking element is moved into said entrance without blocking said entrance.

9. An access control apparatus according to claim 7, wherein an alarm device is provided which is operable upon forcible blockage of the motion of said blocking element from the release position to the blocking position thereof.

10. An access control apparatus according to claim 7, wherein an alarm device is provided which is operable upon unauthorized motion of said blocking element by the action of a force from outside.

11. An access control apparatus according to claim 6, wherein the control of said actuator is alternatively switchable such that said blocking element either blocks said entrance before valid reading of access authorization by said first access authorization reader and releases said entrance only after valid reading by said first access authorization reader, or releases said entrance before valid reading of access authorization by said first access authorization reader and blocks said entrance only after detection of a person by said people sensor before a valid reading by said first access authorization reader.

12. An access control apparatus according to claim 1, wherein said actuator is driven such that said blocking element releases said entrance before reading of the access authorization by said first access authorization reader and blocks said entrance only when detection of a person by said people sensor occurs before valid reading of an access authorization by said first access authorization reader.

13. An access control apparatus according to claim 12, wherein after valid reading of access authorization by said first access authorization reader, said blocking element is moved out of said entrance to indicate the release.

14. An access control apparatus according to claim 1, wherein the control of said actuator is switchable such that in case of a regular flow of people said blocking element releases said entrance before valid reading of access authorization by said first access authorization reader and in case of a decreasing flow of people said blocking element blocks said entrance with a time delay before valid reading of access authorization by said first access authorization reader.

15. An access control apparatus according to claim 1, wherein at least two people sensors are provided before said blocking element.

16. An access control apparatus according to claim 1, wherein at least a second people sensor is provided in the area of said blocking element or after said blocking element.

17. An access control apparatus according to claim 16, wherein said first and second people sensors each have a different scanning characteristic or enclose a different scan angle with the direction of passage.

18. An access control apparatus according to claim 17, wherein said actuator comprises a motor, and said blocking element comprises a rotating arm assembly drivable by said motor.

19. An access control apparatus according to claim 18, wherein said motor is capable of driving said blocking element in both directions of rotation.

20. An access control apparatus according to claim 18, wherein said rotating arm assembly includes at least one blocking arm.

21. An access control apparatus according to claim 20, wherein upon detection of a standing person by said second people sensor provided after said blocking element, said blocking arm is swiveled away from the person standing after said blocking element upon new actuation of said blocking element.

22. An access control apparatus according to claim 20, wherein said blocking arm is padded or formed to be resilient.

23. An access control apparatus according to claim 20, wherein said blocking arm comprises a plastic material.

24. An access control apparatus according to claim 20, wherein said rotating arm assembly comprises only one said blocking arm which is directed obliquely downward away from said entrance in the release position.

25. An access control apparatus according to claim 20, wherein said second people sensor provided in the area of said blocking element detects a person in a blocking plane of said blocking arm.

26. An access control apparatus according to claim 25, wherein upon detection of a person in said blocking plane by said people sensor, said blocking arm is rotated out of the release position toward the blocking position without blocking said entrance.

27. An access control apparatus according to claim 25, wherein after valid reading of access authorization by said first access authorization sensor, said blocking arm is rotated back into the release position to indicate the release of said entrance.

28. An access control apparatus according to claim 25, wherein upon detection of a person in said blocking plane by said people sensor, said blocking arm is rotated further into the blocking position while pushing the detected person.

29. An access control apparatus according to claim 1, wherein at least one of an optical and acoustic signal generator is provided for indicating blocking of said entrance.

30. An access control apparatus according to claim 1, wherein the control of said actuator by said first access authorization reader and said second access authorization reader is designed such that said actuator is driven by said first access authorization reader again, upon valid reading of access authorization of the detected person by said second access authorization reader.

31. An access control apparatus for controlling movement of persons, comprising:

a blocking element for blocking an entrance in an area;

an actuator for moving said blocking element between an open position and a blocking position;

a first access authorization reader disposed before the blocking element for reading a valid access authorization;

a people sensor disposed between the first access authorization reader and the blocking element for sensing the presence of a person; and a second access authorization reader disposed in the area of said blocking element for reading a valid access authorization, wherein said actuator moves said blocking element to an open position or said blocking element remains in an open position when said first access authorization reader reads a valid access authorization before the people sensor detects a person, whereby a person is permitted to pass through the entrance, wherein said actuator drives said blocking element to a closed blocking position or said blocking element remains in a closed blocking position when said first access authorization reader does not read a valid access authorization before said people sensor senses the presence of a person near the entrance, said blocking element remaining in a closed blocking position until said second access authorization reader reads a valid access authorization.

32. An access control apparatus of claim 31, wherein said first access authorization reader is switched off when said people sensor senses the presence of a person near the entrance before said first access authorization reader reads a valid access authorization.

33. An access control apparatus of claim 32, wherein said second access authorization reader is switched on and operates only when said first access authorization reader does not read a valid access authorization before said people sensor senses the presence of a person.

34. An access control apparatus of claim 31, wherein said first access authorization reader and said second access authorization reader comprise non-contact type readers.

* * * * *